US012375277B2

(12) United States Patent
Brown

(10) Patent No.: US 12,375,277 B2
(45) Date of Patent: *Jul. 29, 2025

(54) METHOD AND SYSTEM FOR CHEON RESISTANT STATIC DIFFIE-HELLMAN SECURITY

(71) Applicant: Malikie Innovations Limited, Dublin (IE)

(72) Inventor: Daniel Richard L. Brown, Mississauga (CA)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,122

(22) Filed: Jan. 18, 2024

(65) Prior Publication Data

US 2024/0413993 A1    Dec. 12, 2024

Related U.S. Application Data

(63) Continuation of application No. 18/114,310, filed on Feb. 27, 2023, now Pat. No. 11,902,440, which is a
(Continued)

(51) Int. Cl.
*H04L 9/30* (2006.01)
*H04L 9/00* (2022.01)
*H04L 9/08* (2006.01)

(52) U.S. Cl.
CPC ........... *H04L 9/3066* (2013.01); *H04L 9/002* (2013.01); *H04L 9/006* (2013.01); *H04L 9/0841* (2013.01); *H04L 9/0861* (2013.01)

(58) Field of Classification Search
CPC ....... H04L 9/3066; H04L 9/002; H04L 9/006; H04L 9/0841; H04L 9/0861
(Continued)

(56) References Cited

U.S. PATENT DOCUMENTS 4,200,770 A     4/1980   Diffie et al.
6,141,420 A *  10/2000   Vanstone ............... H04L 9/3066
                                                    708/492
(Continued)

FOREIGN PATENT DOCUMENTS

CA       2587618 A1    5/2006
CN    101099328 A      1/2008
(Continued)

OTHER PUBLICATIONS

Adam Langel Y, Mike Hamburg, and Sean Turner, "Elliptic Curves for Security", CFRG, 2015. https://tools.elf.org/html/drafl-irtf-cfrg-curves-11, Oct. 9, 2015.
(Continued)

*Primary Examiner* — Dereena T Cattungal
(74) *Attorney, Agent, or Firm* — Botos Churchill IP Law LLP

(57) ABSTRACT

A method for providing Cheon-resistance security for a static elliptic curve Diffie-Hellman cryptosystem (ECDH), the method including providing a system for message communication between a pair of correspondents, a message being exchanged in accordance with ECDH instructions executable on computer processors of the respective correspondents, the ECDH instructions using a curve selected from a plurality of curves, the selecting including choosing a range of curves; selecting, from the range of curves, curves matching a threshold efficiency; excluding, within the selected curves, curves which may include intentional vulnerabilities; and electing, from non-excluded selected curves, a curve with Cheon resistance, the electing comprising a curve from an additive group of order q, wherein q is prime, such that $q-1=cr$ and $q+1=ds$, where r and s are primes and c and d are integer Cheon cofactors of the group, such that $cd \leq 48$.

20 Claims, 4 Drawing Sheets

Related U.S. Application Data continuation of application No. 17/862,791, filed on Jul. 12, 2022, now Pat. No. 11,616,648, which is a continuation of application No. 17/069,297, filed on Oct. 13, 2020, now Pat. No. 11,424,924, which is a continuation of application No. 16/164,965, filed on Oct. 19, 2018, now Pat. No. 10,841,092, which is a continuation of application No. 15/145,428, filed on May 3, 2016, now Pat. No. 10,129,026.

(58) Field of Classification Search
USPC .......................................................... 380/30
See application file for complete search history.

(56) References Cited

U.S. PATENT DOCUMENTS

| | | | |
|---|---|---|---|
| 6,778,666 | B1 | 8/2004 | Kuzmich et al. |
| 7,215,708 | B2 * | 5/2007 | Gagarin .................. H04N 19/90 375/E7.206 |
| 7,215,780 | B2 | 5/2007 | Lambert et al. |
| 7,218,735 | B2 | 5/2007 | Coron et al. |
| 8,077,866 | B2 | 12/2011 | Landrock et al. |
| 8,189,772 | B2 | 5/2012 | Vanstone et al. |
| 8,290,146 | B2 | 10/2012 | Takashima |
| 8,464,060 | B2 | 6/2013 | Yao et al. |
| 8,588,409 | B2 | 11/2013 | Brown et al. |
| 9,584,320 | B1 | 2/2017 | Parkinson et al. |
| 2007/0071237 | A1 * | 3/2007 | Brown ..................... H04L 9/002 380/44 |
| 2010/0232601 | A1 * | 9/2010 | Itoh .......................... G06F 7/725 380/28 |
| 2011/0153753 | A1 * | 6/2011 | Childress .............. H04L 51/212 709/206 |
| 2012/0023336 | A1 | 1/2012 | Natarajan |
| 2012/0121075 | A1 * | 5/2012 | Strasters ............. H04L 65/1053 379/93.23 |
| 2012/0314855 | A1 * | 12/2012 | Brown .................. H04L 9/3066 380/28 |

FOREIGN PATENT DOCUMENTS

| | | |
|---|---|---|
| CN | 101489226 A | 7/2009 |
| CN | 101541001 A | 9/2009 |
| CN | 101808319 A | 8/2010 |
| CN | 102098157 A | 6/2011 |
| CN | 103326852 A | 9/2013 |
| CN | 109074759 A | 12/2018 |
| EP | 1805929 A1 | 7/2007 |

OTHER PUBLICATIONS

Alfred J. Menezes, Tatsuaki Okamoto, and Scott A. Vanstone, "Reducing elliptic curve logarithms to logarithms in a finite field", In Proceedings of the 23rd ACM Symp. Theory of Computing, 1991.

Andrea Miele et al, "Efficient ephemeral elliptic curve cryptographic keys," International Association for Cryptologic Research, Jun. 30, 2015, p. 1-18, vol. 20150701:010225.

B. Den Boer, "Diffe-Hellman is as strong as discrete log for certain primes", Advances in Cryptology—Crypto '88, NCS 403, pp. 530-539. Springer, 1989.

Brainpool, "ECG Brainpool Standard Curves and Curve Generation", v. 1.0, Oct. 19, 2005.

Certicom Research, Standards for Efficient Cryptography 1 {SEC 1) version 2.0), May 21, 2009, XP055068724.

Dan Boneh and Xavier Boyen, "Short signatures without random oracles", Advances in Cryptology—EuroCrypt 2004, LNCS 3027, pp. 56-73, 2004.

Daniel J Bernstein et al, "Twisted Edwards Curves", ePrint 2008/013, hllps://cr.yp.to/newelliptic/twisted-20080313.pdf, 2008.

Daniel J Bernstein, "Curve25519: New Diffie-Hellman speed records", Public Key Cryptography—PKG 2006, LNCS 3958, pp. 207-228. http://cr.yp.to/ecdh/curve25519-20060209.pdf, 2006.

Daniel J Bernstein, "Differential addition chains", Technical report, hllp://cr.yp.to/ecdh/diffchain-20060219.pdf, 2006.

Daniel R L Brown, "Some Theoretical Conditions for Menezes-Qu—Vanstone Key Agreement to Provide Implicit Key Authentication," International Association for Cryptologic Research, May 21, 2014, pp. 1-87, vol. 20140707:135918.

Daniel R. L. Brown and Robert P. Gallant. "The Static Diffie-Hellman Problem", ePrint 2004/306, IACR, J004, http://ia.cr/2004/306, Jun. 23, 2005.

Daniel R. L. Brown, "CM55: special prime-field elliptic curves almost optimizing den Boer's reduction between Diffe-Hellman and discrete logs", ePrint 2014/877, IACR, hllp://ia.cr/2014/877, Feb. 24, 2015.

European Patent Office, extended European search report for Application No. 17792314.1 PCT/CA2017050175, dated Jan. 2, 2020.

Ezra Brown, Bruce T. Myers, and Jerome A. Solinas. "Elliptic Curves with Compact Parameters". CORR J001-68, U. of Waterloo, CACR, 2001. http://cacr.uwaterloo.ca/techreports/2001/corr2001-68.ps, 2001.

Gerhard Frey and Herbert Gangl, "How to disguise an elliptic curve (Weil descent)", ECG '98, 1998. http://cacr.uwaterloo.ca/conferences/1998/ecc98/frey.ps, Sep. 15, 1998.

Hugo Krawczyk and Hoeteckwee, "The OPTLS protocol and TLS 1.3", ePrint 2015/978, IACR, 2015. http://ia.cr/2015/978, Oct. 9, 2015.

Igor A. Semaev, "Evaluation of discrete logarithms in a group of p-torsion points of an elliptic curve in characteristic p", Mathematics of Computation, 67:353-356, Jan. 1998.

International Searching Authority, International Search Report for Application No. PCT/CA2017/050175, Issued on May 5, 2017.

J.M. Pollard, "Monte Carlo methods for index computation (mod p)", Mathematics of Computation, 32 (143):918-934, Jul. 1978.

Jung Hee Cheon, "Security analysis of the strong Diffe-Hellman problem", Advances in Cryptology—EuroCrypt J006, LNCS 4004, p. 1, Springer, 2006.

Michael Jacobson, Alfred J_ Menezes, and Andreas Stein, "Solving elliptic curve discrete logarithm problems using Weil descent", J_ of the Ramanujan Mathematical Society, 16:231-260, 2001. http://eprinl.iacr.Jrg/2001/041, May 16, 2001.

Neal Koblitz, "CM-curves with good cryptographic properties", Advances in Cryptology—Crypto '91, LNCS 576, pp. 279-287. Springer, 1991.

Neal Koblitz, "Elliptic curve cryptosystems", Mathematics of Computation, 48(177):203-209, Jan. 1987.

Neel Mehta. "Heartbleed". Various emails and websites, 2014. See: https://en.wikipedia.org/wiki/Heartbleed, Retrieved as early as 2014.

Nhitfield Diffie and Martine. Hellman, "New Directions in Cryptography", IEEE Transactions on Information Theorey, IT—22(6):644-654, Nov. 1976.

Nigel P. Smart, "The discrete logarithm problem on curves of trace one", Journal of Cryptology, 12(3):193-196, Oct. 1999.

NIST, "Recommended Elliptic Curves for Federal Government Use", Jul. 1999.

Office Action, Canadian Patent Application No. 3,020,828, issued Mar. 29, 2023.

Office Action, Chinese Application No. 2017800278659, issued Jul. 1, 2021.

Official Action, European Patent Application No. 17792314.1, issued Sep. 10, 2021.

Official Action, Indian Patent Application No. 201817037346, issued Sep. 10, 2021.

Peter L. Montgomery, "Speeding the Pollard and elliptic curve methods of factorization", Mathematics of Computation, 48(177):243-264, Jan. 1987.

Robert P. Gallant, Robert J_ Lambert, and Scott A. Vanstone, "Faster point multiplication on elliptic curves with efficient endomorphisms", Advances in Cryptology—Crypto 2001, LNCS 2139, pp. 190-200. Springer, 2001.

(56) References Cited

OTHER PUBLICATIONS

Robert P. Gallant, Robert J. Lambert, and Scott A. Vanstone, "Improving the parallelized Pollard ambda search on binary anomalous curves", Mathematics of Computation, 69:1699-1705, May 19, 1999.

SECG, "SEC 1: Elliptic Curve Cryptography", Mar. 2009. Version 2.0. http://www.secg.org/sec1-v2.pdf, Mar. 2009.

Stephen C. Pohlig and Martine. Hellman, "An improved algorithm for computing logarithms over GF(p) and its cryptographic significance", IEEE Transactions on Information Theory, 24:106-110, Jan. 1978.

Taher Elgamal, "A public key cryptosystem and a signature scheme based on discrete logarithms", IEEE Transactions on Information Theory, IT—31(4):469-472, Jul. 1985.

Takakazu Satoh and Kiyomichi Araki, "Fermat quotients and the polynomial time discrete log algorithm for anomalous elliptic curves", Commentarii Mathematici Universitatis Sancti Pauli, 47:81-92, 1998.

Victor S. Miller, "Use of elliptic curves in cryptography", Advances in Cryptology—Crypto '85, LNCS 218, pp. 117-426. Springer, 1985.

Victor Shoup, "Lower bounds for discrete logarithms and related problems", Advances in Cryptology—EuroCrypt 97, LNCS 1233, pp. 256-266. Springer, 1997.

Warwick Ford and Burton S. Kaliski Jr, "Server-assisted generation of a strong secret from a password", In Enabling Technologies: Infrastructure for Collaborative Enterprises—WET ICE 2000, pp. 176-180. IEEE Press, 2000.

Antoine, Joux, et al., "Oracle-assisted static Diffie-Hellman is easier than discrete logarithms", In12th IMA International Conference, Cryptography and Coding 2009, LNCS 5921. Springer, 2009. http://ia.cr/2008/217, 2009.

Cheon, Jung Hee, et al., "Security Analysis of the Strong Diffie-Hellman Problem," International Conference on Financial Cryptography and Data Security, May 28, 2006, pp. 1-11, Springer, Berlin, Heidelberg Lectures Notes in Computer Science; Lecture Notes Computer].

The First Office Action for Chinese Patent Application No. 202210517133.0, Aug. 26, 2024, 5 Pages.

Zhang, "Elliptic Curves in Cryptography: Past, Present and Future", Journal of Shandong University (Natural Science), vol. 48, No. 5, 2013, pp. 1-13.

\* cited by examiner

METHOD AND SYSTEM FOR CHEON RESISTANT STATIC DIFFIE-HELLMAN SECURITY

CROSS REFERENCE TO RELATED APPLICATIONS

This application is a continuation of U.S. patent application Ser. No. 18/114,310, filed Feb. 27, 2023, which is a continuation of U.S. patent application Ser. No. 17/862,791, filed Jul. 12, 2022, now U.S. Pat. No. 11,616,648, issued on Mar. 28, 2023, which is a continuation of U.S. patent application Ser. No. 17/069,297, filed Oct. 13, 2020, now U.S. Pat. No. 11,424,924, issued on Aug. 23, 2022, which is a continuation of U.S. patent application Ser. No. 16/164,965, filed Oct. 19, 2018, now U.S. Pat. No. 10,841,092, issued on Nov. 17, 2020, which is a continuation of U.S. patent application Ser. No. 15/145,428, filed May 3, 2016, now U.S. Pat. No. 10,129,026, issued on Nov. 13, 2018, the disclosure of which is incorporated herein by reference.

TECHNICAL FIELD

The present disclosure relates to static groups in the field of cryptography.

BACKGROUND

The Diffie-Hellman key exchange is a method of securely exchanging cryptographic keys over a public channel. In various systems, the protocol uses a multiplicative group of integers modulo p, where p is a prime. A public value g is a primitive root of modulo p and is raised to an exponent that is secret on each side of the cryptographic transaction. Due to the features of multiplicative groups, the exchange of two primitive roots, each raised to a secret for one of the parties, can be combined together to form a shared secret between the two parties. Due to the discrete logarithm problem an eavesdropper is unable to easily derive the shared secret.

A variation or a special case of the Diffie-Hellman key exchange utilizes elliptic curve cryptography (ECC). In ECC, the group is not a multiplicative group of a finite field, but rather a subgroup of an elliptic curve. The use of elliptic curves allows for a smaller group size than a multiplicative group to achieve the same level of security.

In some forms of Diffie-Hellman key exchange, one party may re-use a secret value many times. This practice may be called static Diffie-Hellman. Jung Hee Cheon, in a paper entitled "*Security analysis of the strong Diffie-Hellman problem.*" Advances in Cryptology—EuroCrypt 2006, LNCS 4004, pg. 1, Springer, 2006, which is incorporated herein by reference, found that in a group size q, if q−1 or q+1 has factors of a certain size, then the static Diffie-Hellman problem is actually considerably easier than best known attacks on the Diffie-Hellman problem. In particular, the Cheon algorithm involves the adversary choosing various points Q and seeing a shared secret xQ by getting a first participant to apply the static private key x to Q. Such Cheon attack makes the Diffie-Hellman protocol less secure.

BRIEF DESCRIPTION OF THE DRAWINGS

The present disclosure will be better understood with reference to the drawings, in which.

DETAILED DESCRIPTION

Figure 1:
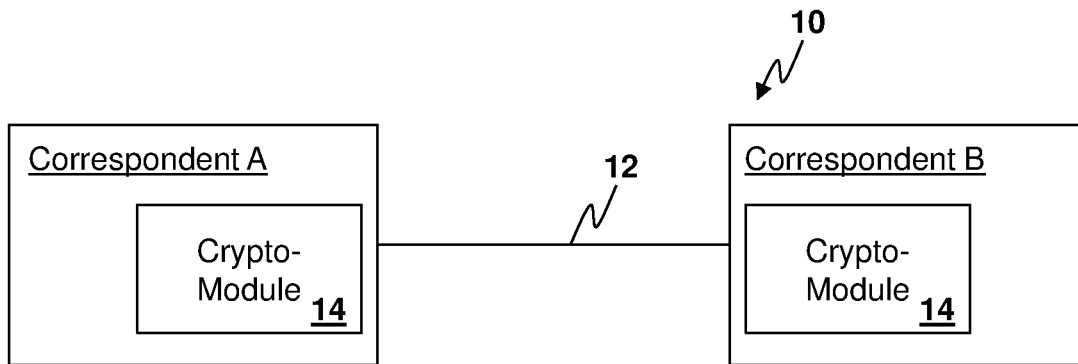
FIG. 1 is a block diagram showing participants exchanging information utilizing cryptographic modules.

The present disclosure provides a method for providing Cheon-resistance security for a static elliptic curve Diffie-Hellman cryptosystem (ECDH), the method comprising: providing a system for message communication between a pair of correspondents, a message being exchanged in accordance with ECDH instructions executable on computer processors of the respective correspondents, the ECDH instructions using a curve selected from a plurality of curves, the selecting comprising: choosing a range of curves; selecting, from the range of curves, curves matching a threshold efficiency; excluding, within the selected curves, curves which may include intentional vulnerabilities; and electing, from non-excluded selected curves, a curve with Cheon resistance, the electing comprising a curve from an additive group of order q, wherein q is prime, such that q−1=cr and q+1=ds, where r and s are primes and c and d are integer Cheon cofactors of the group, such that cd≤48.

The present disclosure further provides a method for providing Cheon-resistance security for a static elliptic curve Diffie-Hellman cryptosystem (ECDH), the method comprising: providing a system for message communication between a pair of correspondents, a message being exchanged in accordance with ECDH instructions executable on computer processors of the respective correspondents, the ECDH instructions using a curve comprising: an additive group of order q, wherein q is prime, such that q−1=cr and q+1=ds, where r and s are primes and c and d are integer Cheon cofactors of the group, such that cd≤48; an affine equation in the form $y^2=x^3+ix$, where $i=\sqrt{-1}$ a length of 454 bits; a field size $p=2^{454}+(3\times17\times11287)^2$; an order $q=2^{452}+(7\times41117)^2$; $r=(q-1)/8$; and $s=(q+1)/6$.

The present disclosure further provides computing device for providing Cheon-resistance security for a static elliptic curve Diffie-Hellman cryptosystem (ECDH), the computing device comprising a processor for executing program instructions configured to: provide a system for message communication between a pair of correspondents, a message being exchanged in accordance with ECDH instructions executable on computer processors of the respective correspondents, the ECDH instructions using a curve selected from a plurality of curves, the selecting comprising: choose a range of curves; select, from the range of curves, curves matching a threshold efficiency; exclude, within the selected curves, curves which may include intentional vulnerabilities; and elect, from non-excluded selected curves, a curve with Cheon resistance, the electing comprising a curve from an additive group of order q, wherein q is prime, such that q−1=cr and q+1=ds, where r and s are primes and c and d are integer Cheon cofactors of the group, such that cd≤48.

The present disclosure further provides a computing device for providing Cheon-resistance security for a static elliptic curve Diffie-Hellman cryptosystem (ECDH), the computing device comprising a processor for executing program instructions configured for: providing a system for message communication between a pair of correspondents, a message being exchanged in accordance with ECDH instructions executable on computer processors of the respective correspondents, the ECDH instructions using a curve comprising: an additive group of order q, wherein q is prime, such that q−1=cr and q+1=ds, where r and s are primes and c and d are integer Cheon cofactors of the group, such that cd≤48; an affine equation in the form $y^2=x^3+ix$, where $i=\sqrt{-1}$; a length of 454 bits; a field size $p=2^{454}+(3\times 17\times 11287)^2$; an order $q=2^{452}+(7\times 41117)^2$; r=(q−1)/8; and s=(q+1)/6.

Reference is now made to FIG. 1, which show a system 10 for message communication between a pair of correspondents. Specifically, in FIG. 1, a pair of correspondents A and B are connected by a data communication link 12. Each of correspondents A and B has a cryptographic module or unit 14 which performs public key cryptography operations according to established protocols to permit secure communication over link 12. The cryptographic units 14 operate within a cryptographic domain whose parameters are shared by other entities.

In one example, correspondents A and B utilize a Diffie-Hellman (DH) key exchange. Specifically, a Diffie-Hellman key exchange uses a commutative group, which is a type of algebraic system with one binary operation and obeying certain axioms.

The group originally proposed by Diffie and Hellman is known as the multiplicative group of the finite field of size p, where p is a prime number. Using such multiplicative group, the set of numbers {1, 2, . . . , p−1}, may have a binary operation defined to be multiplication modulo p, which means multiplication after computing the remainder upon division by p. This group is well-known in mathematics and was applied to cryptography by Diffie and Hellman.

For illustration purposes, consider a small prime p=5. The binary operation, multiplication modulo p for the group can be represented in the following table:

TABLE 1

| Binary operation, multiplication modulo 5 | | | | |
|---|---|---|---|---|
| x | 1 | 2 | 3 | 4 |
| 1 | 1 | 2 | 3 | 4 |
| 2 | 2 | 4 | 1 | 3 |
| 3 | 3 | 1 | 4 | 2 |
| 4 | 4 | 3 | 2 | 1 |

In this group, we have for example 2×4=3. Specifically, a normal multiplication 2×4=8, but in this group, the remainder is computed modulo 5 which gives 3 since 8=1×5+3.

For any element g of a group, and some positive integral number x, we can define $g^x$ by applying the binary operation between x copies of g. This operation is called group exponentiation, and g is called the base and x the exponent. In the case where the group is the multiplicative group of a finite field, group exponentiation is also called modular exponentiation.

Thus, for illustration, let p=5 as in Table 1 above. If g=2 and x=6, then in modular exponentiation, $g^x=2^6=4$. This is because, under conventional exponentiation, $2^6=64$ and the remainder of 64 modulo 5 is 4.

Group exponentiation can be done quite efficiently, even in a large group of size nearly $2^{256}$, using algorithms such as the square-and-multiply algorithm. This algorithm requires at most $\log_2(x)$ group operations to compute $g^x$. In a group size $2^{256}$, a group exponentiation takes 512 group operations or less, which is typically practical.

A discrete logarithm is the inverse of group exponentiation. The discrete logarithm of $y=g^x$ to the base g is x. Computing the discrete logarithm is a "hard" problem in some groups. The hardness of this problem is central to the security of Diffie-Hellman key exchange and related public-key cryptography algorithms, called the discrete logarithm problem (DLP). Hard is a term of art in cryptography and as used herein generally means beyond the reach of an adversary that must be prevented from breaking the system as long as the security of the system is deemed important. Mathematically, the term may mean that the solution to the problem is unsolvable in asymptotic polynomial time.

Thus, public key cryptography relies on the DLP being hard.

Referring again to FIG. 1, in the Diffie-Hellman key exchange, contributor A generates a secret exponent x, and contributor B generates a secret exponent y. A sends $A=g^x$ to B, and B sends $B=g^y$ to A. Contributor A computes $z=B^x$ and contributor B computes $w=A^y$. The computed values are equal since $z=g^{xy}=w$, so both contributors have computed the same shared value w=z.

For groups in which the discrete logarithm problem is hard, it is typically believed that it is hard for an adversary E to compute z and w from g, A, and B. The problem is now known as the Diffie-Hellman problem (DHP). The DHP can be solved by solving the DLP: given $A=g^x$, find x by solving the DLP, and then compute $B^x$, by group exponentiation, thereby solving the DHP, since $w=z=B^x$. Therefore, the DHP is no harder than the DLP. The DHP might be easier than the DLP, but in some cases, one can solve the DLP by solving the DHP, although the conversion may be more costly.

The above is the basic general form of the Diffie-Hellman key exchange.

Subsequent to the Diffie-Hellman key exchange being described, ElGamal introduced a method of using the same Diffie-Hellman groups for digital signatures, which allow contributors A and B to be sure of each other's messages. ElGamal also clarified the Diffie-Hellman key exchange could be used to build public-key encryption schemes. In one example, contributor B can use a fixed Diffie-Hellman private key, while contributor A can use an ephemeral private key which has only one key per message it wishes to send to contributor B.

Elliptic Curve Cryptography

Elliptic curve cryptography (ECC) may be viewed as a special case of the Diffie-Hellman system for public-key cryptography.

In ECC, the group is not a multiplicative group for a finite field, but rather a subgroup of an elliptic curve. As indicated above, one reason to use ECC is that, for groups of the same size, the DLP is harder in ECC than the DLP in classic DH groups. This allows for smaller groups to be used for the same level of security. Although use of elliptic curve (EC) groups is slower than use of finite field (FF) groups of the same size, because EC groups can be much smaller for the same level of security, they can have similar speeds for FF groups of the same security.

In general, a curve is any 1-dimensional set of points. An algebraic curve is defined by a polynomial equation. A planar curve is a curve embedded in a plane. One simple example of a planar algebraic curve, is a circle having the equation $x^2+y^2=1$ in the (x,y)-plane.

Every curve, according to the mathematical theory known as algebraic geometry, has a number called its genus. Genus 0 curves include lines, circles, ellipses, parabolas and hyperbolas. Generally, a genus 0 curve is any curve whose points can be reversibly transformed into numbers, using only rational functions in both directions of the transformation. For example, a circle has a genus 0 by mapping the point (x,y) to the number $w=y/(x+1)$. This mapping can be reversed by $(x,y)=((1-w^2)/(1+w^2), 2w/(1+w^2))$.

Consequently, a genus 0 curve can have only a component in the real (x,y) plane. While hyperbolas appear to have two components, these are connected in the extension of the plane to the projective line, which considers asymptotes to act like points at infinity.

The simplest class of curves after genus 0 curves are genus 1 curves. These are traditionally also called elliptic curves, due to their origins in measuring the arc length of an ellipse.

A simple form of an elliptic curve is a planar cubic curve. Planar cubic curves are those defined by the cubic equation in the plane. A small class of cubic curves have genus 0, and these exceptions are called singular cubics. Otherwise, most cubic planar curves have genus 1.

A traditional form of cubic equation for elliptic curves is the Weierstrass cubic, which includes equations such as $y^2=x^3+ax+b$, where a and b are fixed numbers and (x,y) are the coordinates of points in the plane.

Other types of cubic equations are also interesting to study, and can be useful in ECC.

The theory of algebraic geometry defines a group on the set of points of an elliptic curve. More generally, every curve has an associated group, called its Jacobian group. For genus 0 curves, the group has size 1, so it is not very interesting or useful for cryptography. For genus 2 or higher curves, the group is quite complicated, but these groups have received consideration for use in cryptography.

The Jacobian group of planar cubic curves is defined as follows. A point O is fixed to be the group identity. By tradition this elliptic curve is written using addition for the binary operation. So instead of writing xy for a group operation applied to group elements x and y, we write X+Y for group elements X and Y.

To add points X and Y, form the line L through X and Y. If X and Y are the same point, then choose the line through X that is tangent to the curve. Since the curve is cubic, the line intersects at either 0, 1, or 3 points, where tangencies are counting as two points, and inflections are counted as 3 points.

Since the line L already intersects the curve in two points, it must intersect the curve in 3 points. Two of these points are X and Y, the third is point Z.

The same procedure may be done on another point O and on Z to obtain another point, which serves as the definition of X+Y.

Since elliptic curves traditionally use addition instead of multiplication to write their group operation, the previous terminology and notation for DH groups may be adjusted. The previous operation of group exponentiation, written as $g^x$, is now called scalar multiplication, and is written as ×G. Further, the discrete logarithm is sometimes referred to as "elliptic curve discrete logarithm problem" (ECDLP) as needed to avoid confusion with the discrete logarithm problem in other groups.

The elliptic curve Diffie-Hellman (ECDH) groups used in cryptography represent the coordinates of a point with a finite field. Thus, finite field Diffie-Hellman groups (FFDH groups) and ECDH groups both use finite fields. In FFDH groups, a group element is a nonzero finite field element. In ECDH groups, a group element is typically a pair of finite field elements, which together satisfy a cubic equation. The finite field used in ECDH groups is typically called the underlying field of the curve and of the ECDH group. In some embodiments, the term field of definition is also used.

As indicated above, one advantage of the ECDH group is that the discrete logarithm problem seems to be harder for a group size than the FFDH group. Thus, if we choose an ECDH group and an FFDH group in which the discrete logs are about equally hard, and too hard for any practical algorithm to solve, then typically the ECDH group will be faster for users.

One main reason that an FFDLP is easier than an ECDLP is that FFDH groups have better notions of large and small elements. These notions of size in FFDLP permit discrete logs by breaking large elements into combinations of smaller elements, whose discrete logarithms are easier to find. This general strategy to solving the FFDLP is sometimes called index calculus or sieving. No effective index calculus algorithms have been discovered for typical elliptic curve groups.

In most ECDH groups, the best known algorithms to compute discrete logs are generic group algorithms. Generic group algorithms work in any group, and simply use group operations as a black box. The speed of the generic group algorithms for computing the discrete log is limited. Specifically, if the group has a size divisible by a prime n, then computing discrete logs with generic group algorithms at significant success rate requires at least approximately $n^{1/2}$ group.

Some rare cases of elliptic curves have discrete logs that are easier to solve. These may be solved using the Menezes, Okamoto, Vanstone (MOV) attack and the Satoh, Araki, Semaev, Smart (SASS) attack. These rare cases can be detected easily and standards for ECC explicitly avoid these special-case attacks.

Further, beyond the hard discrete logarithm problem, secure ECC needs to avoid side-channel attacks. Side channels arise when the implementation of ECDH and other algorithms leak additional information, such as information about correspondents A and B.

In static Diffie-Hellman, as described below, security is desirable against side channels. This is defined in accordance with the following. Suppose that correspondent A has a secure key m and a static DH module that computes mP for any input P in a given static Diffie-Hellman secure group. Further suppose that the module leaks no absolutely no other information about m (so the module has no side-channels or computes no signatures with m). In this case, correspondent A can use the module in any set of protocols whatsoever without revealing m. Further, even if the protocols are insecure, they may compromise each other, but they will not reveal m.

Care is needed to implement such ECDH without side channels. In some embodiments, certain algorithms are found to be easier to implement without side channels and one such algorithm is the Montgomery ladder.

An efficient form of the Montgomery ladder uses equations of the form: $by^2=x^3+ax^2+x$.

The above equation is cubic and generally defines an elliptic curve. The Montgomery ladder equation above is not usual in the Weierstrass equation, and has historically not been preferred by mathematical treatments of elliptic curves since it is slightly less general than the Weierstrass equation.

In elliptic curve cryptography, the equations are defined over a finite field rather the usual numbers on a real line. Typically, the finite field is a prime field and has integers modulo a prime p. This helps ensure that the points in the group are easily represented within a finite amount of information, and also helps to ensure that the discrete logarithm problem is hard.

Much of the efficiency for the ECC users depends on the choice of p, since the arithmetic involves computing remainders modulo p. By choosing p close to a power of two, or some other special form, the speed of ECC in software nearly doubles compared to a random prime p.

Figure 2:
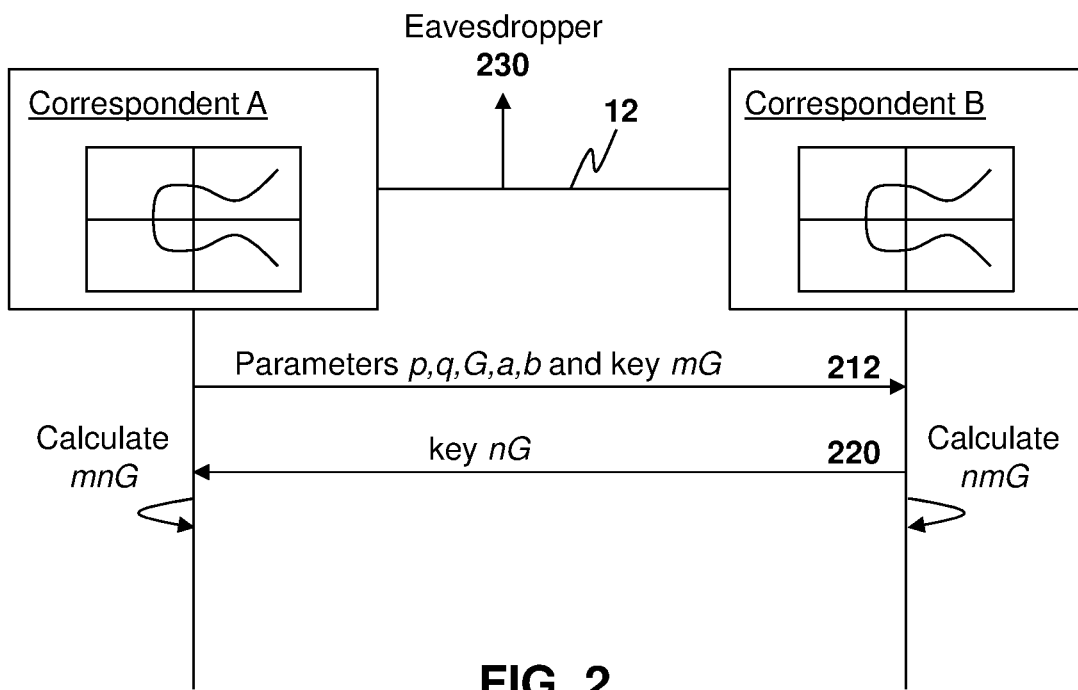
FIG. 2 is a data flow diagram showing the establishment of a shared secret in an elliptic cryptography Diffie-Hellman system.

The use of ECDH is provided, for example, to obtain a shared secret over a public connection. Reference is now made to FIG. 2.

In FIG. 2, correspondent A and correspondent B wish to communicate securely over a public channel 12. Correspondents A and B agree to use elliptic curve Diffie-Hellman to obtain the shared secret for communication.

In particular, correspondent A may choose the curve and parameters and communicate these to correspondent B in order to assure the use of the same curve between the parties.

Further, each of correspondents A and B have a secret integer value, which may be considered the private key for each correspondent. Thus, correspondent A has a secret integer m and correspondent B has a secret integer n.

The parameters that are shared may include p, which is a prime number that indicates the order of the field $F_p$. Parameters a and b are the values from the Weierstrass equation $y^2=x^3+ax+b$. The parameters further include the group generator G which has an order q.

Referring again to FIG. 2, at the initiation of the session, correspondent A sends, in message 212, parameters p, a, b, G, q to correspondent B. Message 212 further includes the value mG, which may be considered the public key for correspondent A.

Correspondent B receives message 212 and extracts the parameters. Correspondent B then provides value nG, which may be considered the public key for correspondent B, back to correspondent A in message 220.

Correspondent B further utilizes the curve to calculate the shared secret nmG using its private key along with the public key of correspondent A.

Similarly, correspondent A utilizes the curve to calculate the shared secret mnG using its private key along with the public key of correspondent B.

Since nmG=mnG the correspondents A and B now have a shared secret.

An eavesdropper 230 can see all communications between correspondents A and B. Therefore eavesdropper 230 will know the curve parameters, along with public keys mG and nG. However, due to the discrete logarithmic problem, the eavesdropper will be unable to calculate shared secret nmG.

The present disclosure relates to determination of a curve and curve parameters.

Point Counting

One of the main challenges in choosing an elliptic curve group for cryptography is determining its size. Although elliptic curve Diffie-Hellman (ECDH) can be operated without knowledge of the group's size, its security depends on the largest prime factor of the group's size due to the Pohlig-Hellman and Pollard rho algorithms. In particular, using ECDH with a group of unknown size n carries a risk that the largest prime factor of n is too small.

Other cryptographic applications of elliptic curve groups, such as digital signatures, may need direct knowledge of the group's size in order to work properly.

Schoof-Elkies-Atkin (SEA) is a general method of determining the size of an elliptic curve group. Counting the number of points on a random elliptic curve over a finite field of the sizes needed for secure cryptography using the SEA method takes, typically, under a second for 256-bit curves or under a minute for larger curves of a 512-bit field.

Based on this, point-counting is practical unless one needs to try a very large number of elliptic curves in order to meet strict criteria. However, in the embodiments described herein, curves are sought that need to meet very strict criteria. These rather strict criteria may mean that millions of curves need to be tried and a million minutes is approximately 2 years.

Certain elliptic curves over finite fields are special in the sense of having a small value for their fundamental determinant D. The fundamental determinant is a number that relates the size n of the curve to the size p of the underlying field. Such curves are often described as having complex multiplication (CM), and are called CM curves. CM curves are rare and typically a random curve has very large discriminant D.

Knowing p and D allows one to determine n quickly. Furthermore, if D is small, it is possible to find a curve with fundamental determinant D. This is part of the complex multiplication method.

One form of the CM method is to fix p, and try various small D until a curve with suitable properties is found. Searching using the CM method is much faster than searching using the SEA method.

Another variant of the CM method fixes D to a very small value, in which case finding the curve is trivial. The method then searches through different possible values of p. This method is faster because it avoids the slowest steps of the previous CM method, which is finding the curve from various small D. The main disadvantage of the method is that it requires considering various p values.

The embodiments described herein utilize the above method, with a fixed D and a varying p. Because the method is fast, it can be used to find curves meeting very strict criteria.

The Static Diffie-Hellman Problem

In some form of Diffie-Hellman key exchange, contributor A will re-use the secret value many times. This practice can be called static Diffie-Hellman.

Examples of static Diffie-Hellman includes ElGamal encryption and its variants elliptic curve integrated encryption scheme (ECIES), a recently proposed optimized layer security (OPTLS) key agreement algorithm for transport layer security (TLS) ⅓, and the Ford-Kaliski password-hardening scheme.

Thus, the static Diffie-Hellman problem is a variant of the general Diffie-Hellman problem in which an adversary tries to exploit the constant re-use of a secret value.

Static Diffie-Hellman groups protect some cryptographic protocols from the risk of certain types of failures. Specifically, an additive group of order q is a static Diffie-Hellman group if, for a uniformly random secret integer a∈{0, 1, 2, . . . , q−1}, no feasibly-efficient algorithm can use an oracle A for the function that computes A(P)=aP (for any input P in the group) to find the secret a. Quantitatively: a group is (c, o, s) static Diffie-Hellman secure if no algorithm costing at most c group operations, making at most o queries to the oracle A, has success rate at least s at finding secret a.

Diffie-Hellman group security is provided through three notions. First, a discrete logarithm group is a group in which the discrete logarithm problem (computing a from aP) is infeasible, and discrete logarithm security quantifies how difficult the problem is.

Second, Diffie-Hellman security quantifies the difficulty of the Diffie-Hellman problem (computing abP from aP and bP), with Diffie-Hellman groups being those with intractable Diffie-Hellman problem.

Third, Diffie-Hellman groups and security are defined similarly.

The Cheon Attack

As indicated above, the Cheon attack showed that, if a group size q is such that q−1 or q+1 has factors of a certain size, then the static Diffie-Hellman problem is actually considerably easier than the best known attacks on the Diffie-Hellman problem.

The Cheon algorithm involves an adversary choosing various points Q and seeing correspondent A shared secret xQ by getting correspondent A to apply her static private key x to Q.

Some Diffie-Hellman protocols are believed to thwart Cheon's attack in any group. Correspondent A could, for example apply a key derivation function to xQ to get key k, and then correspondent A discards xQ. If the key derivation function is one-way then in practice this could thwart the Cheon algorithm. Nonetheless, it may be safer to also rely on Cheon's algorithm not being feasible in the first place, rather than to rely on a key derivation function and the secure deletion of xQ.

In other words, choosing a group in which Cheon's attack is infeasible provides a second tier of defence against a Cheon attack, where the first tier of defence would be the key derivation function itself.

In other cases, such as for example the Ford-Kaliski password-hardening the xQ may be made public. However for such groups, the need to resist the Cheon attack is much stronger.

Thus, in accordance with the embodiments of the present disclosure, a Cheon resistant curve is a curve that has a group size q such that both q−1 and q+1 avoid the factorization conditions that make Cheon's algorithm faster than Pollard rho.

In accordance with the above, Cheon resistance is defined as follows. An additive group of order q is near-optimally Cheon-resistant if q is prime, and q−1=cr and q+1=ds for primes r and s and integers c and d such that cd≤48. The pair (c, d) are the Cheon cofactors of the group.

In the above, the condition on the Cheon cofactors (c,d) is arbitrary and chosen for simplicity. In an alternative embodiment, a more complicated definition may be provided. For example, for each prime q, consider optimal parameters the Cheon's algorithm. Let c be the cost c of this optimal version of Cheon algorithm against a generic group of size q. Let $q=\log_q(c)$. Now consider a set of candidate primes q that are potentially suitable for implementation of static Diffie-Hellman. For example, the set might be all primes of some bit length. Let $y_+$ be the maximum value of $\gamma_q$ for all candidate values of q. An alternative definition of nearly-optimal Cheon-resistant group size q is that $\gamma_q=(1-\epsilon_q)\gamma_+$ under some definition of a small upper bound on $\epsilon_q$. This alternative definition, though not complete, is already almost too complicated for any practical application, hence the simpler definition above.

Subverted Cryptographic Algorithms

Another consideration for choosing curves is the avoidance of cryptographic algorithms that have been deliberately subverted to be vulnerable to secret attacks. One known countermeasure to subverted cryptographic algorithms is to choose an algorithm whose overall description is very compact. A compact algorithm tends to prevent the possibility of a saboteur tinkering with the algorithm parameters by trial and error. In this case, a trial-and-error search could force weak parameters to be relatively large, and thus less compact than more honest parameters. As used herein, "honest" means parameters or algorithms that are not specifically chosen to be weak. Such countermeasure is often called "nothing-up-my-sleeve". More recently, it has been called "rigidity", with a slightly different meaning.

Therefore, in accordance with another embodiment of the present disclosure, a compact algorithm is chosen. While choosing the compact algorithm does not protect against all sabotage, in some cases the weakest versions of algorithms have the smallest values of the parameters and thus are more compact and more honest versions of the algorithm. The main countermeasure to sabotage this form is to properly identify the weak versions of the algorithm. In other words, traditional cryptanalysis is utilized. A secondary countermeasure it to prove that equivalence of any hypothetical attacks over any values of the algorithm's parameters.

Based on the above, given that Cheon-resistant curves are desirable, and that some protocols need to rely on the security of the static Diffie-Hellman problem, the present disclosure provides for elliptic curves that are more likely to have optimal static Diffie-Hellman security, as constrained by other characteristics of the curves.

Conversely, one does not want to sacrifice important properties of the Diffie-Hellman, either security or efficiency. Therefore, the challenge is to boost evidence for Cheon resistance of a static Diffie-Hellman group, without compromising other features.

In accordance with one embodiment of the present disclosure, a set of very specific criteria may be established in order to solve the main deficiency of most other elliptic curve proposals, namely the risk of weak static Diffie-Hellman problem.

Particularly, various criteria exist for both security and efficiency of the elliptic curve. These include resistance to the usual elliptic curve attacks such as: large bit length to resist Pollard rho attack; small cofactor to resist Pohlig-Hellman attack; high embedding degree to resist MOV attack; curve order not equal to field order to resist SASS attacks; and cofactor divisible by four for better side-channel resistance and efficiency.

However, these basic criteria do not address the risk of a weak static Diffie-Hellman problem. Accordingly, a further criterion is added in accordance with the present disclosure to the above basic criteria and that is that Cheon's attack is resisted nearly optimally for a bit length in order to implement strong static Diffie-Hellman security.

Since Cheon-resistance is an advanced security property, the present disclosure provides an emphasis on security rather than efficiency. Therefore, rather than opt to choose the most efficient or smallest curve of adequate security, in accordance with the present disclosure a range of more secure or larger curves of adequate efficiency are considered. Among such curves, efficiency is sought utilizing the following criteria: small enough bit length to be practical; relatively efficient for bit length including field size close to a power of two and an efficient endomorphism.

Further, in accordance with the embodiments of the present disclosure, some effort, or by-products of the above criteria, are applied to address concerns of intentionally vulnerable cryptographic algorithms. These include factors including that the curve is compact. In particular, all the curve's parameters are compact, expressible as a compressed form. Further, the curve is compact by ensuring the curve was not maliciously manipulated.

The vulnerabilities are addressed through ease of generation and regeneration. Thus, in accordance with the embodiments described below, only seconds are needed to check each candidate curve on an older PC model rather than months on a cluster of servers.

In accordance with the above, in one embodiment a near-optimally Cheon-resistant elliptic curve with complex multiplication by i suggesting superior Boneh-Boyen static Diffie-Hellman security and admitting a Bernstein ladder, with length of 454 bits, referred to herein as Crib454, is provided. However, this curve is merely one example, and the principles described herein can be applied to find other curves matching the criteria described.

The criteria for Crib454 is based on both security and efficiency as described below.

The CRIB454 curve is described utilizing the following criteria:

$$p=2^{454}+(3\times17\times11287)^2$$

$$q=2^{452}+(7\times41117)^2$$

$$r=(q-1)/8$$

$$s=(q+1)/6$$

The above criteria are probable primes.

Further, the elliptic curve with affine equation is defined as: $y^2=x^3+ix$.

The above curve has n=4q points, including a point at infinity, over a field $F_p$ of size p As usual, $i\equiv(-1)^{1/2}$ mod p. In this respect, $i\equiv 2^{227}/(3\times17\times11287)$ mod p.

The above criteria provide one example of a curve that may be used in accordance with the present disclosure. Other curves, based on the factors provided below, may also be used.

For ease of generation, efficiency and compactness, the specific criteria require complex multiplication (CM). Further, complex multiplication by i was chosen since such multiplication provides very efficient endomorphism and matches with the cofactor 4 criteria. The alternative linear endomorphism curves have complex multiplication by a cube root of unity, but these have a cofactor 3, which may be less desirable.

While it has been suggested in the art that curves with complex multiplication are risky, in 30 years no attacks on CM curves have materialized, which provides strong evidence that CM curves are as good as non-CM curves. In fact, two reasons that CM curves might offer better security than non-CM curves include, first, that efficient endomorphism permits use of a larger curve, which increases the difficulty of known attacks for a given level of efficiency, and potentially provides a margin of error against mild attacks on CM. In this case, mild is defined in the sense of being only slightly better than Pollard rho attacks.

Secondly, CM curves belong to a special class of curves, which potentially avoid some problems of most non-CM curves. For example, consider resistance to Pohlig-Hellman attacks, which is strongest for the special class of almost-prime (low cofactor) DH groups. Other examples exist to show that special curves may be safer than non-CM curves.

There only a few elliptic curves, up to isomorphism, over a given prime finite field, having complex multiplication by i. Some of these have a cofactor divisible by 8 and therefore should be avoided. This typically fixes the curve equation, up to isomorphism.

For Cheon-resistance security, the embodiments of the present disclosure attempt to select near-optimal Cheon resistance relative to curve size, as this can be viewed as the strongest evidence for having a strong static Diffie-Hellman security. To achieve this near-optimal Cheon-resistance, the Cheon cofactors were then defined to be nearly minimal. In the notation of Crib454, the chosen Cheon cofactors are 8 and 6, because r=(q−1)/8 and s=(q−1)/6. In the above, group order is the prime q, while r and s are primes related to q.

The specific choice of Cheon cofactor pair (8,6), instead of (1,1) or (6,8) or (2,24) was made for two reasons. First, some pairs like (1,1) are impossible due to the divisibility properties of numbers involved. Indeed, the product of the numbers in the pair should be divisible by 12, because the product of the two numbers adjacent to any prime larger than or equal to five is divisible by 12.

Specifically, if q is such a prime, then q−1 or q+1 must be divisible by 3. Both q−1 and q+1 are even and one must be divisible by 4.

Secondly, the prime p, which is the size the underlying field, was selected to a have a special form. Specifically, the special form is a quasi-Fermat prime because this form permits fairly good efficiency for its size. This special form implies that the first Cheon cofactor is divisible by 8, and the product of the Cheon cofactors is divisible by 48.

The general criteria for p is that it is simple, compact and efficient. The specific criteria is that p is a power of two plus or minus a small number. In some embodiments, the smaller the number the better. With p being a power of two plus or minus a small number, p is very simple, compact and efficient. The specific criteria that p be a quasi-Fermat prime, which it is a power of two plus a small number (not minus), seems to be imposed by the abbreviated form of the CM method.

The abbreviated form of the CM method is a further criterion. In this form of the CM method, the usual step of determining q from p, via Cornacchia's algorithm, is replaced by a simpler formula, in which both p and q are calculated from some given integers. The abbreviated approach is faster than the usual CM method because it avoids Cornacchia's algorithm, which aids in the reproducibility of the method.

The abbreviated method also results in a more compact form for p and q, which aids in arguing that the curve was not manipulated, since it lacks any random-looking parameters.

The last specific criterion is defining how to measure closeness to the power of two. For this, a simple and natural rule as possible was chosen. Rather than using absolute differences as a measure of closeness, a relative difference was used. Specifically, the relative difference is the absolute difference divided by the exponent to the power of two.

For example, in Crib454, $p=2^{454}+(3\times17\times11287)^2$, so the relative difference is $(3\times17\times11287)^2/454$. The relative difference is more natural than the absolute difference, because of the prime number theorem, which gives heuristic predictions of the probability of numbers being prime. Under this heuristic, the rarity of primes is a function of the relative difference, not the absolute difference.

The closeness to the power of two is the last and thus it is given the lowest priority of the criteria. Thus, the other criteria are decided first, but the previous criteria can all be expressed in the formula. Thus it only remains to do the calculations, most consisting of primality tests. This generates a list of candidate curves. Of the suitable curves, the one having minimal relative difference is selected.

One computer algorithm for doing the above is provided in Appendix A. The computer code in Appendix A verifies the Crib454 criteria, but could easily be adapted by those skilled in the art to produce other curves meeting the criteria above.

Figure 3:
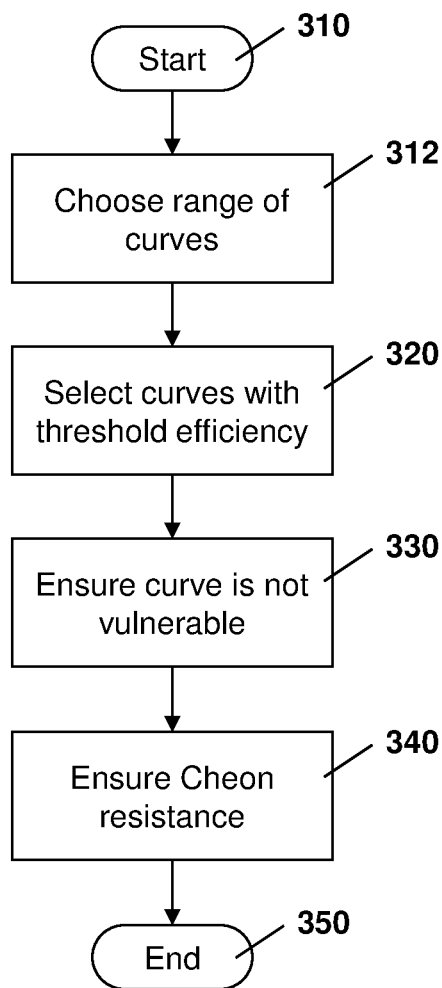
FIG. 3 is a process diagram showing a process for selecting a Cheon-resistant curve.

Further, the above may be summarized with reference to FIG. 3. In particular, FIG. 3 shows a flow diagram for the derivation of a curve that has near-optimal Cheon resistance.

The process of FIG. 3 starts at block 310 and proceeds to block 312 in which a range of curves is chosen. Specifically, the size of the curve may be determined at block 312 to meet minimal security requirements for the ECDH application.

From block 312 the process proceeds to block 320 in which the range of curves from block 312 is further reduced to select a curve with a threshold efficiency. In particular, the selected curve as described above should be small enough to be practical. Further, the field size should be close to a power of two. Further, the selection at block 320 should limit the curves to those exhibiting efficient endomorphism.

From block 320 the process proceeds to block 330 in which the curves selected at block 320 are further reduced to eliminate curves that may exhibit vulnerabilities. In particular, at block 330 the selected curves are reduced to those that are compact and not maliciously manipulated. Further, the curves are reduced to those that are easy to generate.

From block 330 the process proceeds to block 340 in which Cheon resistance is ensured by ensuring the curves avoid the factorization conditions that make Cheon's algorithm faster than Pollard rho.

The process then proceeds to block 350 and ends.

Figure 4:
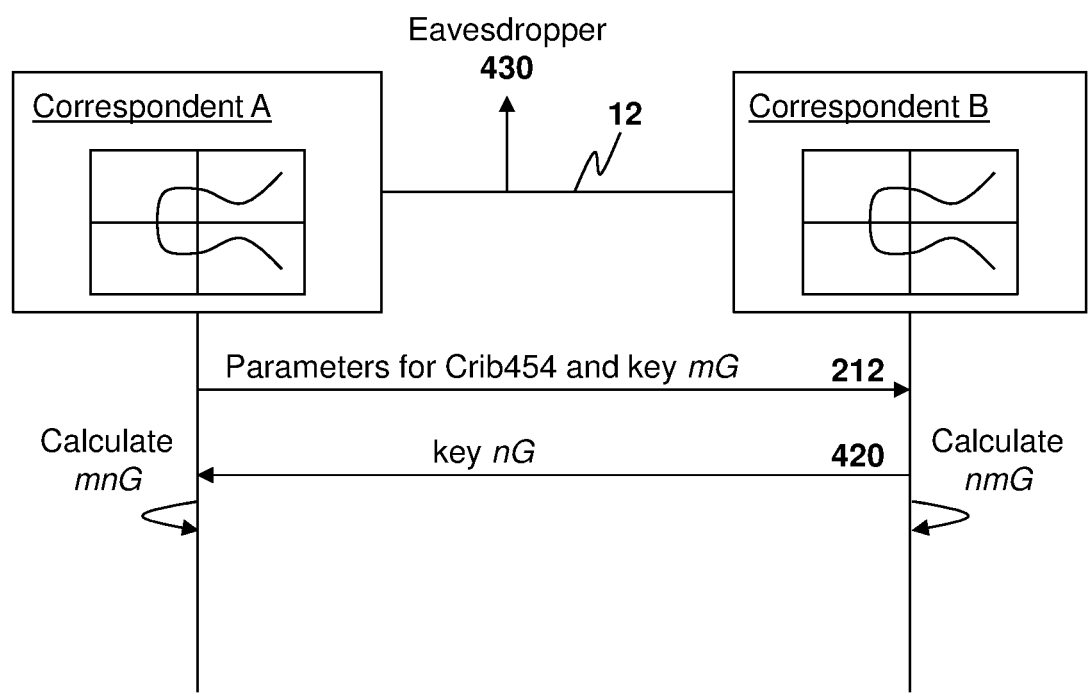
FIG. 4 is a data flow diagram showing the establishment of a shared secret in an elliptic cryptography Diffie-Hellman system using specific criteria.

Using the Crib454 parameters above, reference is now made to FIG. 4. In particular FIG. 4 shows the embodiment of FIG. 2 in which the generic parameters for the curve are specifically substituted for the Crib454 parameters.

Thus, correspondent A communicates with correspondent B over a secure channel. In the embodiment of FIG. 4 correspondent A sends message 412, which includes $p=2^{454}+(3\times17\times11287)^2$ and $q=2^{452}+(7\times41117)^2$. Further, $a=i$ and $b=0$. G is any fixed point on the curve provided it has order q.

Correspondent A further sends its public key mG in message 412 to correspondent B. However, in other embodiments the public key may be sent in a subsequent message.

Correspondent B sends its public key nG to correspondent A in message 420.

At this point, due to the curve parameters and the public keys, each of correspondents A and B can calculate the shared secret, while eavesdropper 430 cannot calculate the shared secret due to the discrete logarithmic problem. Further, the eavesdropper 430 will be unable to use the Cheon attack due to the Cheon resistance built into the curve parameters.

The above may be implement using any computing device. For example, one simplified computing device is provided with regards to FIG. 5.

Figure 5:
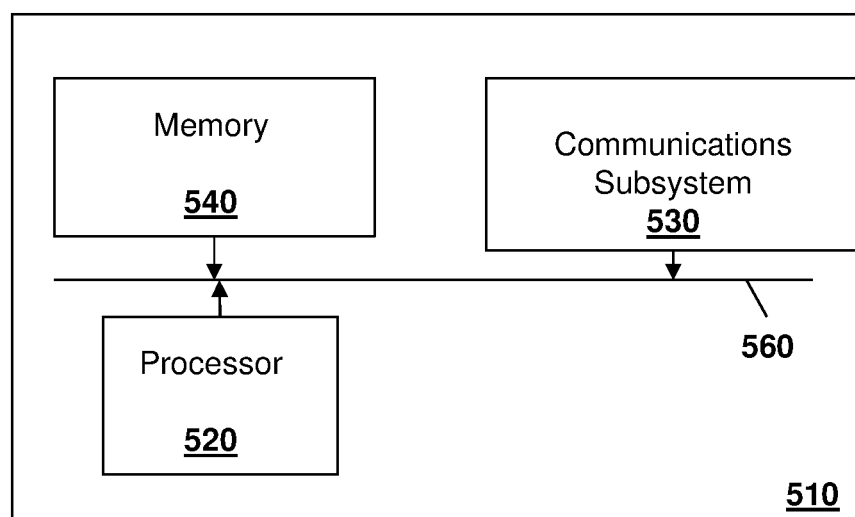
FIG. 5 is a block diagram of a simplified computing device capable of performing the embodiments of the present disclosure.

In FIG. 5, device 510 includes a processor 520 and a communications subsystem 530, where the processor 520 and communications subsystem 530 cooperate to perform the methods of the embodiments described above.

Processor 520 is configured to execute programmable logic, which may be stored, along with data, on device 510, and shown in the example of FIG. 5 as memory 540. Memory 540 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 540, device 510 may access data or programmable logic from an external storage medium, for example through communications subsystem 530.

Communications subsystem 530 allows device 510 to communicate with other devices or network elements.

Communications between the various elements of device 510 may be through an internal bus 560 in one embodiment. However, other forms of communication are possible.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A

Code Used to Generate CRIB454

```
// strong_ecdh.cc
// Dan Brown
// 2015-August-25
// Compile using:
// g++ -O3 strong_ecdh.cc -lntl
// Try to find triples (t,z,u) with u= +/-1, such that the following
// numbers:
// p = 2^(2t) + (12z+2u+1)^2
// q = 2^(2t-2) + (6z+u)^2
// r = (q-1)/8
// s = (q+1)/6
// are prime. (If t,z,u are integers and t >= 3, then p,q,r,s are
// integers.)
// Note t-1 loosely corresponds to "security level"
// Like t >= 127 for sufficient DH security.
// Like t <= 300 for practical DH performance.
// Look at smaller and larger t just for completeness.
// Like |z| as small as possible for efficiency.
// Try |z| < t^d for d=1,2,3,4, getting successively more hits.
# include <NTL/ZZ.h>
using namespace std ;
using namespace NTL ;
// T_MAX is maximum size of t, a constant
// Z_ABS is maximum size |z|: e.g. expresion in t
# if 0
# elif 1 // Crib454 only non-trivial hit
// Slowly test for medium |z|
// Found Crib454 in ~ 4 sec on old PC
# define Z_ABS t*t //
# define T_MAX 400 // Took ~ 30 sec to 1.5 min old PC
// 500 // Took ~ 2-5 min on old PC
// Don't expect any non-trivial hits, since not enough z
```

-continued

```
// Got five trivial hits plus
// (t,z,u) = (227,-47970,1)
// yielding the interesting elliptic curve Crib454!
// other test parameters given below ...
# elif 0
// Quickly test for smaller |z|, but larger t.
# define Z_ABS t
# define T_MAX /* 1024 // Took ~ 10 sec on old PC */ \
3072 // Took ~ 7 min on old PC.
// Don't expect (m)any hits for non-trivial t.
// Trivially small hits:
// (t,z,y) = (3,2,1) ---> (p,q,r,s) = (593, 137, 17, 23)
// (t,z,u) = (6,-2,-1) ---> (p,q,r,s) = (4721, 1193, 149, 199)
# elif 0 // Allow slightly larger |z| than for Crib454
# define Z_ABS 10*t*t //
# define T_MAX 300 // Took ~ 1.5 min on old PC
// new hit: (t,z,u) = (173,-125658,-1)
20
# elif 1
//    SLOWLY    test for medium |z|
//
// !!! --- very slow, e.g. > 30min --- !!!
//
# define Z_ABS t*t*t
# define T_MAX 300 // took ~46min on old PC
// Decent chance of a hit for each t.
// Most interesting outputs: // log_t(|z|)
// (t,z,u) = (116,-1330894,1) // 2.966
// (t,z,u) = (159,-522010,1) // 2.597
// (t,z,u) = (161,-3559998,-1) // 2.969
// (t,z,u ) = (173,-125658,-1) // 2.278
// (t,z,u) = (224,-2710302,-1) // 2.737
// (t,z,u) = (227,-47970,1) // 1.987
// (t,z,u) = (289,13349730,1) // 2.895
# else
// Sanity check:
# define Z_ABS t*t*t*t
# define T_MAX 128
# endif
// Expect many hits ... need to limit # per t.
// Got 7 hits at t = 32.
// For <= 256-bit field, the most interesting example:
// (t,z,u) = (127,-10402698,-1)
// Convert |z| bound into a string.
# define STRING_1(x) #x
# define STRING_2(x) STRING_1(x)
# define Z_STRING STRING_2(Z_ABS)
// Following NTL style guide to use long instead of int.
bool five_or_more_test (long t, long z, long u)
{
// for meaning of t,z,u, see comments in function mod_test.
// uncomment this to remove sieving test ...
// return true ; // Much slower!
// Sieving risks knocking trivially small t ...
// so let's skip sieving for small t
if ( t <= 15 ) {
// note r >= 2^(2t-5).
// If t>20, then r > 2^35
// If t>15, then r > 2^25
return true ;
}
# define SIEVE_MAX ((sizeof (primes))/(sizeof (long)))
const long primes [ ] = {
// what is the most efficient set of primes to put here?
// the savings are achieved by avoiding big integer math
// it's silly to include the list of primes in the code
// should instead generate them at a start-up.
// it seems to make sense to sieve pretty far given the NTL
// primality testing interface. Although NTL could try trial
// division, which should not be significantly slower than the
// stuff here, it will also do Miller--Rabin on one of p,q,r,s
// before doing trial division on the others.
5,7,
11,13,17,19, 23,29, 31,37, 41,43,47,
53,59, 61,67, 71,73,79, 83,89, 97,
101,103,107,109, 113, 127, 131,
137,139, 149, 151,157, 163,167,
173,179, 181, 191,193,197,199,
211,223,227,229,233,239,241,251,257,263,269,271,277,281,283,293,
307,311,313,317,331,337,347,349,353,359,367,373,379,383,389,397,
401,409,419,421,431,433,439,443,449,457,461,463,467,479,487,491,499,
503,509,521,523,541,547,557,563,569,571,577,587,593,599,
601,607,613,617,619,631,641,643,647,653,659,661,673,677,683,691,
701,709,719,727,733,739,743,751,757,761,769,773,787,797,
809,811,821,823,827,829,839,853,857,859,863,877,881,883,887,
907,911,919,929,937,941,947,953,967,971,977,983,991,997,
/* The following does not help too much, except for larger t */
1009,1013,1019,1021,1031,1033,1039,1049,1051,1061,1063,1069,1087,
1091,1093,1097,1103,1109,1117,1123,1129,1151,1153,1163,1171,1181,
1187,1193,1201,1213,1217,1223,1229,1231,1237,1249,1259,1277,1279,
1283,1289,1291,1297,1301,1303,1307,1319,1321,1327,1361,1367,1373,
1381,1399,1409,1423,1427,1429,1433,1439,1447,1451,1453,1459,1471,
1481,1483,1487,1489,1493,1499,1511,1523,1531,1543,1549,1553,1559,
1567,1571,1579,1583,1597,1601,1607,1609,1613,1619,1621,1627,1637,
1657,1663,1667,1669,1693,1697,1699,1709,1721,1723,1733,1741,1747,
1753,1759,1777,1783,1787,1789,1801,1811,1823,1831,1847,1861,1867,
1871,1873,1877,1879,1889,1901,1907,1913,1931,1933,1949,1951,1973,
1979,1987,1993,1997,1999,2003,2011,2017,2027,2029,2039,2053,2063,
2069,2081,2083,2087,2089,2099,2111,2113,2129,2131,2137,2141,2143,
2153,2161,2179,2203,2207,2213,2221,2237,2239,2243,2251,2267,2269,
2273,2281,2287,2293,2297,2309,2311,2333,2339,2341,2347,2351,2357,
2371,2377,2381,2383,2389,2393,2399,2411,2417,2423,2437,2441,2447,
2459,2467,2473,2477,2503,2521,2531,2539,2543,2549,2551,2557,2579,
2591,2593,2609,2617,2621,2633,2647,2657,2659,2663,2671,2677,2683,
2687,2689,2693,2699,2707,2711,2713,2719,2729,2731,2741,2749,2753,
2767,2777,2789,2791,2797,2801,2803,2819,2833,2837,2843,2851,2857,
2861,2879,2887,2897,2903,2909,2917,2927,2939,2953,2957,2963,2969,
2971,2999,3001,3011,3019,3023,3037,3041,3049,3061,3067,3079,3083,
} ;
long index ;
static long last_t = -1;
static long powers[SIEVE_MAX];
if (t != last_t) {
// compute 2^(2t-4) modulo each prime in primes.
long prime ;
if ( t != 1 + last_t) {
/ / do a full computation ...
long t_reduced ;
for( index = 0 ; index < SIEVE_MAX; index ++ ) {
prime = primes[index];
// reduce t by Fermat's little theorem
t_reduced = (2*t - 4) % (prime-1) ;
// compute power by repeated doubling ...
// for larger moduli, would need square and multiply
powers[index] = 1;
for (long i = 0; i < t_reduced; i++) {
powers[index] += powers[index] ;
powers[index] %= prime ;
}
}
} else {
// t == 1 + last_t ;
// just do an update of the last computation ...
for( index = 0 ; index < SIEVE_MAX; index ++ ) {
prime = primes[index];
// double twice ...
for (long i = 0; i < 2; i++) {
powers[index] += powers[index] ;
powers[index] %= prime ;
}
}
}
last_t = t ;
}
// now powers[index] is 2^(2t-4) mod primes[index].
for (index = 0 ; index < SIEVE_MAX; index++ ){
long power = powers[index];
long prime = primes[index];
long tester ;
// check for small factors in 3s
// recall 3s = 2^(2t-3) + 1 + 3z(6z+2u)
tester = 2*power + 1 + 3*z*(6*z + 2*u) ;
if (0 == tester%prime ) {
return false ;
}
// check for small factors in 2*r
// recall 2r = 2^(2t-4) + z(9z+3u)
tester = power + z * (9*z + 3*u) ;
```

```
if (0 == tester%prime ) {
return false ;
}
// check for small factors in q
// recall q = 2^(2t-2) + (6z+u)^2
tester = 4*power + (6*z+u) * (6*z+u) ;
if (0 == tester%prime ) {
return false ;
}
// check for small factors in p
// recall p = 2^(2t) + (12z+2u+1)^2
tester = 16*power + (12*z+2*u+1)*(12*z+2*u+1) ;
if (0 == tester%prime ) {
return false ;
}
}
return true ; // sieving passed
}
bool mod_test(long t, long z, long u)
{
// Quickly check p,q,r,s for small prime factors, without any big
// integer math.
// Primes 2 and 3 are special cases handled in this function,
// because divisions by 2 and 3 are involved, we must work modulo
// powers of 2 and 3.
// Primes 5 and larger handled more systematically by a call to
// another function.
// Here are the definitions of p,q,r,s in terms of t,z,u.
// p = 2^(2t) + (12z+2u+1)^2
// q = 2^(2t-2) + (6z+u)^2
// r = 2^(2t-5) + z(9z+3u)/2
// s = (2^(2t-3)+1)/3 + z(6z+2u)
// Ensure that p,q,s are odd.
// Each of p,q,s is even+odd=odd. Only r must be checked.
// We only need that z(9z-3u) is not divisible by four.
// Working mod 4, we see that we z(z+u) = 2 mod 4. We know
// it will be 0 or 2 (or −2 for %), so we eliminate 0.)
if (0 == (z*(z+u))%4){
return false ;
}
// Second ensure that r and s are not divisible by 3.
// Mod 3:
// p = 1 + (2u+1)^2 = 1 + (0 or 1) = 1 or 2
// q = 1 + (1 or 2)^2 = 1 + 1 = 2
// r = 2 + 0 = 2
// So, p,q,r are not divisible by 3.
// To handle s, we consider 3s mod 9, and check that it is 3 or 6,
// or really that it is not 0.
// Mod 9: 3s = 2^(2t-3) + 1 + 6uz.
// we can compute (2^(2t-3) + 1) mod 9 by table lookup.
if ( 0 == ( (long [ ]){0,6,3}[t%3] + 6*u*z)%9) {
return false ;
}
// Finally, let's sieve modulo small primes.
return five_or_more_test(t,z,u) ;
}
long prime_test(long t, long z, long u)
{
ZZ p,q,r,s ;
long y;
y = 6*z + u ;
// to do:
// instead of calling power2_ZZ below, we should instead
// re-use previous value and then double
// also we should avoid the the /
// these efficiencies are probably dominated by the
// cost of calling ProbPrime ... so we defer them.
p = power2_ZZ(2*t) + (2*y+1)*(2*y+1) ;
q = power2_ZZ(2*t-2) + y*y ;
r = (q−1)/8 ;
s = (q+1)/6 ;
// The modular tests and the form of y should ensure that the
// divisions above are exact.
if( ProbPrime(s) && ProbPrime(r) && ProbPrime(q) && ProbPrime(p)) {
cout << "\r (t,z,u) = ("
<< t << "," << z << "," << u << "} "
<< " " << "\b\b\b\b\b\b" // over-write "progress"
<< "\t" // since, tab does not over-write.
;
if (t >= 127) {
cout << "probably generates q-strong ECDH parameters, \n";
} else {
cout << "too small, otherwise special ...\n" ;
}
return 1;
}
return 0;
}
long test_t_z_u (long t, long z, long u)
{
// first do some small-integer modular tests:
if (mod_test (t,z,u)) {
// If the small integer tests pass, then do big-integer primality
// tests:
return prime_test (t,z,u) ;
}
return 0;
}
long test_t_z (long t, long z)
{
long hits = 0;
hits += test_t_z_u(t,+z,+1);
hits += test_t_z_u(t,+z,−1);
if (z > 0) {
hits += test_t_z_u(t,−z,+1);
hits += test_t_z_u(t,−z,−1);
}
return hits ;
}
int main ( )
{
long t, z, hits;
long t_max = T_MAX;
long t_min = (T_MAX>128)? 3 : 126;
cout
<< "Looking for an elliptic curve with: \n"
<< " \n"
<< "1) complex multiplication by i, \n"
<< " enabling Gallant--Lambert--Vanstone speed-up. \n"
<< " Curve equation: y^2 = x^3 + ix. \n"
<< " \n"
<< "2) a special field size:\n"
<< " p = 2^(2t) + (12z+2u+1)^2, where u^2 = 1,\n"
<< " which may be more efficienct than a random field size.\n"
<< " \n"
<< "3) cofactor 4, a curve size of 4q, for prime, \n"
<< " q = 2^(2t-4) + (6z+u)^2 \n"
<< " which enables Montgomery and Edwards speed-ups. \n"
<< " \n"
<< "4) near-optimal Cheon-resistance: \n"
<< " r=(q−1)/8 and s=(q+1)/6. \n"
<< " are both prime.\n"
<< " \n"
;
cout
<< "Testing t with " << t_min
<< " <= t <= " << t_max
<< " and |z| <= " Z_STRING ".\n";
for (t = t_min ; t <= t_max ; t++) {
// test each z
for (z = 0, hits=0 ; (z <= Z_ABS) && (hits <= 4); z++) {
hits += test_t_z(t,z) ;
if (0==(z+1)%100000) {
// did not check if cerr over-writes any cout hits :(
cerr << "\r" << "Progressed past t == " << t
<< ", |z| <= " << z << " ";
}
}
// Display current value of t
cerr << "\r" << "Progressed past t <= " <<
<< " ";
}
cout << "\n" << "Done!" << "\n" ;
return 0;
}
```

The invention claimed is:

1. A method for providing Cheon-resistance security for a static elliptic curve Diffie-Hellman cryptosystem (ECDH), the method comprising:
    providing a processor to facilitate communication between a first computing device and a second computing device;
    obtaining, by the processor, a curve with Cheon resistance for a first computing device, the obtaining the curve comprising selecting a curve from an additive group of order q, wherein q is prime, such that $q-1=cr$ and $q+1=ds$, where r and s are primes and c and d are integer Cheon cofactors of the additive group, such that $cd \leq 48$;
    obtaining, by the processor, a private key for the first computing device using the curve with Cheon resistance;
    computing, by the processor, a public key for the first computing device using the curve with Cheon resistance;
    transmitting, by the processor, the public key for the first computing device to the second computing device;
    receiving, by the processor, a public key for the second computing device;
    computing, by the processor, a shared secret based on the public key for the second computing device and the private key for the first computing device, wherein the first and second devices agree to use the shared secret for communication; and
    facilitating communication between the first and second computing devices using the shared secret.

2. The method of claim 1, wherein the curve with Cheon resistance:
    is chosen from a range of curves matching a threshold efficiency; or
    excludes curves which may include intentional vulnerabilities; or both.

3. The method of claim 2, wherein the excluding comprises excluding curves which are non-compact or difficult to generate.

4. The method of claim 1, wherein the curve with Cheon resistance is chosen from:
    a range of curves having a length matching a threshold security level; or
    curves having a field size close to a power of two, and having efficient endomorphism; or
    both.

5. The method of claim 1, wherein the curve has an affine equation in a form $y^2=x^3+ix$, where $i=\sqrt{-1}$.

6. The method of claim 5, wherein the curve has length of 454 bits.

7. The method of claim 6, wherein a field size $p=2^{454}+(3\times17\times11287)^2$; order $q=2^{452}+(7\times41117)^2$; $r=(q-1)/8$; and $s=(q+1)/6$.

8. A system for providing Cheon-resistance security for a static elliptic curve Diffie-Hellman cryptosystem (ECDH), the system comprising:
    a processor
    a first computing device; and
    a second computing device, wherein the processor facilitates communication between the first and second computing devices, the processor being configured to:
        obtain a curve with Cheon resistance for the first computing device, the curve being obtained by selecting a curve from an additive group of order q, wherein q is prime, such that $q-1=cr$ and $q+1=ds$, where r and s are primes and c and d are integer Cheon cofactors of the additive group, such that $cd \leq 48$;
        obtain a private key for the first computing device using the curve with Cheon resistance;
        compute a public key for the first computing device using the curve with Cheon resistance;
        transmit the public key for the first computing device to the second computing device;
        receive a public key for the second computing device;
        compute a shared secret based on the public key for the second computing device and the private key for the first computing device, wherein the first and second devices agree to use the shared secret for communication; and
        facilitate communication between the first and second computing devices using the shared secret.

9. The system of claim 8, wherein the curve with Cheon resistance:
    is chosen from a range of curves matching a threshold efficiency; or
    excludes curves which may include intentional vulnerabilities; or both.

10. The system of claim 8, wherein the curve with Cheon resistance is chosen based on excluding comprising excluding curves which are non-compact or difficult to generate.

11. The system of claim 8, wherein the curve with Cheon resistance is chosen from:
    a range of curves having a length matching a threshold security level; or
    curves having a field size close to a power of two, and having efficient endomorphism; or both.

12. The system of claim 8, wherein the curve has an affine equation in a form $y^2=x^3+ix$, where $i=\sqrt{-1}$.

13. The system of claim 12, wherein the curve has length of 454 bits.

14. The system of claim 13, wherein the curve has a field size $p=2^{454}+(3\times17\times11287)^2$; order $q=2^{452}+(7\times41117)^2$; $r=(q-1)/8$; and $s=(q+1)/6$.

15. A non-transitory computer readable medium for storing instruction code for providing Cheon-resistance security for a static elliptic curve Diffie-Hellman cryptosystem (ECDH), the instruction code, when executed on a processor of a system to facilitate communication between a first computing device and a second computing device, wherein the instruction causes the processor to:
    obtain a curve with Cheon resistance for the first computing device, the curve being obtained by selecting a curve from an additive group of order q, wherein q is prime, such that $q-1=cr$ and $q+1=ds$, where r and s are primes and c and d are integer Cheon cofactors of the additive group, such that $cd \leq 48$;
    obtain a private key for the first computing device using the curve with Cheon resistance;
    compute a public key for the first computing device using the curve with Cheon resistance;
    transmit the public key for the first computing device to the second computing device;
    receive a public key for the second computing device;
    compute a shared secret based on the public key for the second computing device and the private key for the first computing device, wherein the first and second computing devices agree to use the shared secret for communication; and
    facilitate communication between the first and second computing devices using the shared secret.

16. The non-transitory computer readable medium of claim 15, wherein the curve with Cheon resistance:
is chosen from a range of curves matching a threshold efficiency; or
excludes curves which may include intentional vulnerabilities; or both.

17. The non-transitory computer readable medium of claim 15, wherein the curve with Cheon resistance is chosen by on excluding curves which are non-compact or difficult to generate.

18. The non-transitory computer readable medium of claim 16, wherein the curve with Cheon resistance is chosen from:
a range of curves having a length matching a threshold security level; or
curves having a field size close to a power of two, and having efficient endomorphism; or both.

19. The non-transitory computer readable medium of claim 15, wherein the curve has an affine equation in a form $y^2 = x^3 + ix$, where $i = \sqrt{-1}$.

20. The non-transitory computer readable medium of claim 19, wherein the curve has length of 454 bits.

* * * * *